United States Patent
Potash

(10) Patent No.: US 12,153,874 B1
(45) Date of Patent: Nov. 26, 2024

(54) REWRITING TEXT GENERATED BY A GENERATIVE MODEL

(71) Applicant: Microsoft Technology Licensing, LLC, Redmond, WA (US)

(72) Inventor: Peter Potash, Gatineau (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/342,678

(22) Filed: Jun. 27, 2023

(51) Int. Cl.
*G06F 40/166* (2020.01)

(52) U.S. Cl.
CPC .................................. *G06F 40/166* (2020.01)

(58) Field of Classification Search
CPC ...... G06F 40/166; G06F 40/20; G06F 40/232; G06F 40/226
See application file for complete search history.

(56) References Cited

U.S. PATENT DOCUMENTS

| | | | | |
|---|---|---|---|---|
| 2017/0371885 A1* | 12/2017 | Aggarwal | ............. | G06F 3/0484 |
| 2024/0095458 A1* | 3/2024 | Sawarkar | ................ | G06F 40/40 |
| 2024/0144049 A1* | 5/2024 | Cheng | ...................... | G06N 5/04 |

OTHER PUBLICATIONS

Vaibhav Sharma et al., Data Collection Methods for Building a Free Response Training Simulation, Apr. 1, 2019, Systems and Information Engineering Design Symposium, pp. 1-6 (Year: 2019).*

Rong Ma et al., Research on Automatic Generation of Social Short Text Based on Backtracking Pattern, Apr. 14, 2023, Asia-Pacific Conference on Image Processing—Electronics and Computers, pp. 1-12 (Year: 2023).*

Gao, et al., "RARR: Researching and Revising What Language Models Say, Using Language Models", In Repository of arXiv:2210.08726v3, May 31, 2023, 30 Pages.

International Search Report and Written Opinion received for PCT Application No. PCT/US2024/031516, Sep. 10, 2024, 13 pages.

Liu, et al., "Evaluating Verifiability in Generative Search Engines", In Repository of arXiv:2304.09848v1, Apr. 19, 2023, 25 Pages.

* cited by examiner

*Primary Examiner* — Tam T Tran
(74) *Attorney, Agent, or Firm* — CALFEE, HALTER & GRISWOLD LLP

(57) ABSTRACT

A computing system performs several acts, where the acts include providing text generated by a generative model and content of a webpage to a computer-implemented text rewriting model, where the generative model generated the text based upon user input received from a client computing device, and further where the generative model generated a citation to the webpage to indicate that the text generated by the generative model is supported by the content of the webpage. The acts also include generating, by the computer-implemented text rewriting model, a rewriting of the text, where the computer-implemented text rewriting model generates the rewriting of the text based upon: 1) the text generated by the generative model; and 2) the content of the webpage. The acts further include transmitting the rewriting of the text to the client computing device for presentment as a response to the user input received from the client computing device.

20 Claims, 10 Drawing Sheets

304 — PERSONAL COMPUTERS WERE NOT VERY FAST COMPARED TO MODERN MACHINES. COMPUTER XXXX WAS ONE OF THE EARLIEST AND MOST INFLUENTIAL COMPUTERS AND WAS DESIGNED IN 1974 BY RESEARCHERS (WEBPAGE 1). COMPUTER XXXX HAD A CLOCK SPEED OF 4 MHz, MEANING THAT IT COULD PERFORM FOUR MILLION INSTRUCTIONS PER SECOND (WEBPAGE 2).

302 — HOW FAST WERE PERSONAL COMPUTERS IN 1975?

300

PERSONAL COMPUTERS WERE NOT VERY FAST COMPARED TO MODERN MACHINES. COMPUTER XXXX WAS ONE OF THE EARLIEST AND MOST INFLUENTIAL COMPUTERS AND WAS DESIGNED IN 1974 BY RESEARCHERS (WEBPAGE 1). ~~COMPUTER XXXX HAD A CLOCK SPEED OF 4 MHz, MEANING THAT IT COULD PERFORM FOUR MILLION INSTRUCTIONS PER SECOND.~~ COMPUTER XXXX HAD A CLOCK SPEED OF 2 MHz, MEANING THAT IT COULD PERFORM TWO MILLION INSTRUCTIONS PER SECOND (WEBPAGE 2). ACTUAL PERFORMANCE OF THE COMPUTER, HOWEVER, WAS MUCH SLOWER, BECAUSE THE COMPUTER HAD NO SERIAL BUS AND NO VIDEO DISPLAY OR KEYBOARD; THE USER WAS FORCED TO ENTER AND READ DATA USING SWITCHES AND LEDs ON THE FRONT PANEL (WEBPAGE 3). —304

HOW FAST WERE PERSONAL COMPUTERS IN 1975? —302

PERSONAL COMPUTERS WERE NOT VERY FAST COMPARED TO MODERN MACHINES. COMPUTER XXXX WAS ONE OF THE EARLIEST AND MOST INFLUENTIAL COMPUTERS AND WAS DESIGNED IN 1974 BY RESEARCHERS (WEBPAGE 1). COMPUTER XXXX HAD A CLOCK SPEED OF 4 MHz, MEANING THAT IT COULD PERFORM FOUR MILLION INSTRUCTIONS PER SECOND (WEBPAGE 2). ACTUAL PERFORMANCE — 304

HOW FAST WERE PERSONAL COMPUTERS IN 1975? — 302

FIG. 5

PERSONAL COMPUTERS WERE NOT VERY FAST COMPARED TO MODERN MACHINES. COMPUTER XXXX WAS ONE OF THE EARLIEST AND MOST INFLUENTIAL COMPUTERS AND WAS DESIGNED IN 1974 BY RESEARCHERS (WEBPAGE 1). COMPUTER XXXX HAD A CLOCK SPEED OF 2 MHz, MEANING THAT IT COULD PERFORM TWO MILLION INSTRUCTIONS PER SECOND (WEBPAGE 2). ACTUAL PERFORMANCE OF THE COMPUTER — 304

HOW FAST WERE PERSONAL COMPUTERS IN 1975? — 302

304 — PERSONAL COMPUTERS WERE NOT VERY FAST COMPARED TO MODERN MACHINES. COMPUTER XXXX WAS ONE OF THE EARLIEST AND MOST INFLUENTIAL COMPUTERS AND WAS DESIGNED IN 1974 BY RESEARCHERS (WEBPAGE 1). COMPUTER XXXX HAD A CLOCK SPEED OF 2 MHz, MEANING THAT IT COULD PERFORM TWO MILLION INSTRUCTIONS PER SECOND (WEBPAGE 2). ACTUAL PERFORMANCE OF THE COMPUTER, HOWEVER, WAS MUCH SLOWER, BECAUSE THE COMPUTER HAD NO SERIAL BUS AND NO VIDEO DISPLAY OR KEYBOARD; THE USER WAS FORCED TO ENTER AND READ DATA USING SWITCHES AND LEDs ON THE FRONT PANEL (WEBPAGE 3).

302 — HOW FAST WERE PERSONAL COMPUTERS IN 1975?

REWRITING TEXT GENERATED BY A GENERATIVE MODEL

BACKGROUND

Relatively recently, generative models, such as the Generative Pre-trained Transformer 4 (GPT-4) model and the BigScience Large Open-science Open-access Multilingual (BLOOM) language model, have become available to the general public and can be readily accessed by end users who have an Internet connection. A generative model generates output (such as text, images, and/or video) based upon a prompt provided to the generative model. Conventionally, the prompt includes user input set forth to the model, previous user inputs set forth to the model during a communications session with the user, and outputs generated by the generative model during the communications session. A known issue with generative models, and specifically generative models that output text, is that the generative models can output misleading and/or factually incorrect information (where a misleading and/or factually incorrect statement by a generative model is referred to as a hallucination). In an example, a generative model receives a prompt that includes the user input "how many home runs did Babe Ruth hit before turning 30?". Based upon such prompt, the generative model may output the text "Babe Ruth hit 189 home runs before he turned 30 years old." This statement, however, is factually incorrect, and the user is not provided with any indication as to how the generative model created such text.

To at least partially address this issue, a generative model has been configured to communicate with a search engine, generate text based upon content of a webpage identified by the search engine, and generate a citation to the webpage—therefore, the generative model provides a user with an identity of a source upon which generated text is based. The user can then check the webpage to ensure that the text output by the generative model is accurate (and not misleading).

Often, users view a citation as being confirmation of the veracity of the text that corresponds to the citation. Even when, however, a generative model generates text based upon content of a webpage (where the content of the webpage is included in a prompt used by the generative model to generate the text), the generative model may still output misleading and/or factually incorrect text that is not supported by the content of the webpage that is cited as supporting the text. An end user who is provided with the text and the citation may incorrectly assume that the citation to the webpage included in the output ensures that the text generated by the generative model is supported by the content of the webpage.

SUMMARY

The following is a brief summary of subject matter that is described in greater detail herein. This summary is not intended to be limiting as to the scope of the claims.

Described herein are various technologies pertaining to rewriting text generated by a generative model such that the rewritten text is supported by content of a webpage cited to by the generative model as supporting the text. With more specificity, a generative model generates text based upon user input received by the generative model, and the generative model further generates a citation for the text. The citation for the text identifies a source of content employed by the generative model to generate the text. For example, the citation identifies a webpage that includes the content employed by the generative model to generate the text.

Output of the generative model is monitored, and a citation in the output is identified. Thereafter, text that corresponds to the citation in the output is identified. For example, a sentence prior to the citation in the output of the generative model is identified as corresponding to the citation. Identification of the citation and corresponding text can occur while the generative model continues to generate output (tokens). A prediction as to whether the text is factually accurate (and not misleading) is made based upon the text and the content used by the generative model to generate the text. For example, a classifier is trained to predict whether texts generated by the generative model are factually accurate based upon the texts and contents of webpages cited by the generative model as supporting the texts.

When it is predicted that the text is not supported by the content referenced in the citation generated by the generative model, a computer-implemented text rewriting model can generate a rewriting of the text. For example, the text rewriting model receives the text generated by the generative model and the content from the webpage identified in the citation that corresponds to the text. The text rewriting model generates the rewriting of the text based upon the text and the content. The text generated by the generative model can then be replaced by the rewriting of the text generated by the text rewriting model.

The technologies described result in an improvement over conventional generative models, as outputs provided to users when employing the technologies described herein include fewer misleading and/or factually incorrect statements when compared to outputs provided to users by conventional generative models. Specifically, text that is not supported by content of a webpage that is identified by the generative model as supporting the text is rewritten to ensure that a rewriting of the text is supported by the content cited to by the generative model.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3-7 depict graphical user interfaces (GUIs) corresponding to a generative model.

DETAILED DESCRIPTION

Figure 1:
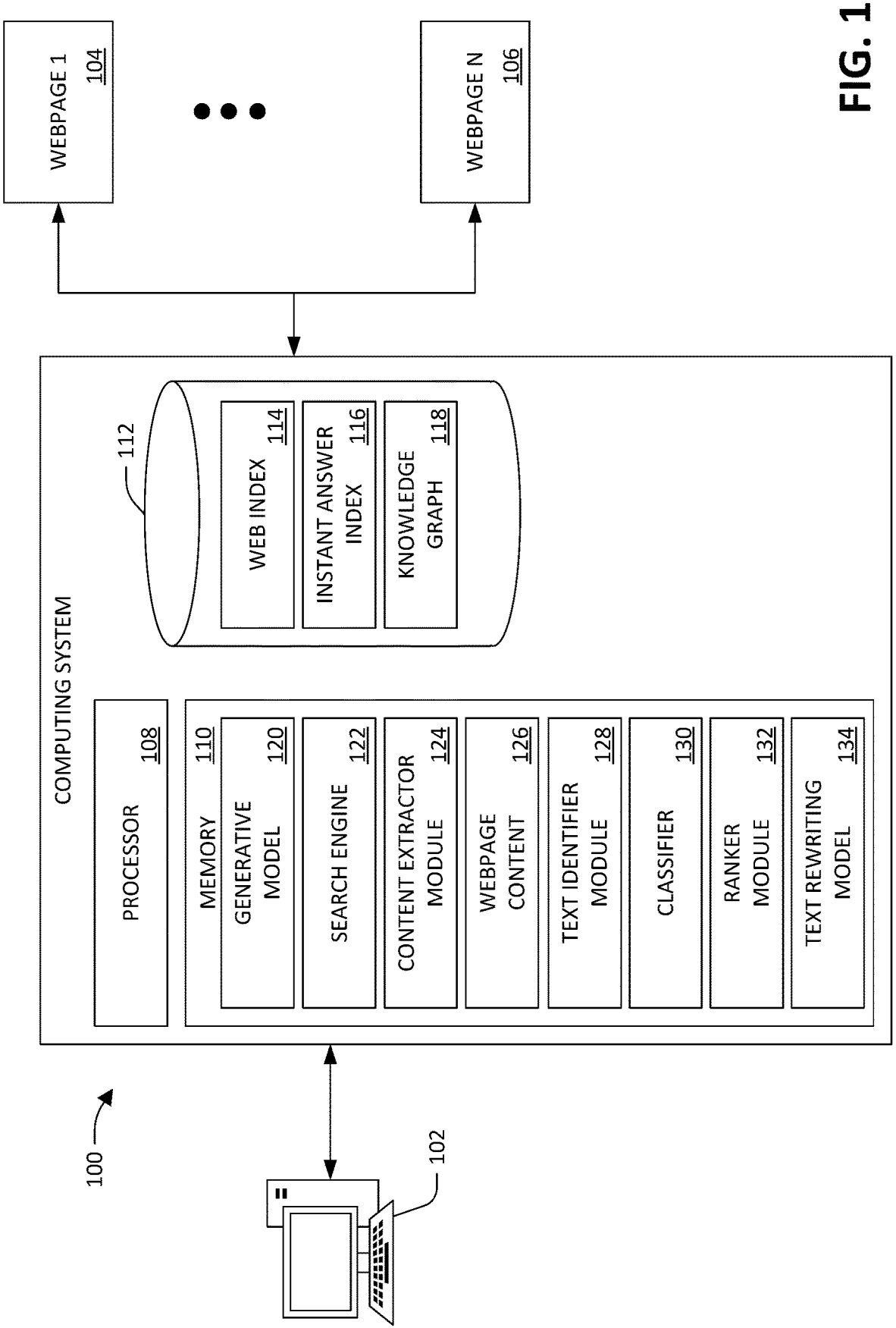
FIG. 1 is a functional block diagram of a computing system that is configured to rewrite text generated by a generative model.

Various technologies pertaining to rewriting text generated by a generative model, and thus correcting hallucinations output by the generative model, are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various features pertaining to rewriting text generated by a generative model in connection with correcting hallucinations output by the generative model. The generative model is in communication with a search engine, such that the search engine can identify a webpage that includes content related to user input, and the content can be included in a prompt provided to the generative model. The generative model generates text based upon the content of the webpage. Further, the generative model can generate a citation to the webpage and associate the citation with the text, thereby indicating to a user that the text generated by the generative model is supported by content of the webpage. It has been observed, however, that the generative model can generate text and associate a citation to a webpage with the text, yet the webpage does not support the text generated by the generative model. For example, the text generated by the generative model may include a misleading and/or factually incorrect statement that is not supported by the content of the webpage.

Situations where the generative model hallucinates can be detected through use of a classifier, where the classifier is provided with the text generated by the generative model and the content cited to by the generative model as supporting the text. The classifier, based upon the text generated by the generative model and the aforementioned content, can predict whether the content supports the text. When output of the classifier indicates that the text generated by the generative model is not supported by the content cited to by the generative model, a computer-implemented text rewriting model can generate a rewriting of the text. For example, the text rewriting model generates the rewriting of the text based upon the text generated by the generative model and the content cited to by the generative model. Accordingly, when the generative model outputs a hallucination and cites a webpage to support such output, the hallucination can be detected and text can be rewritten, such that the rewritten text is supported by the webpage.

With reference now to FIG. 1, a functional block diagram of a computing system 100 that is configured to: 1) detect hallucinations in text generated by a generative model; and 2) generate a rewriting of such text is presented. The computing system 100 is in communication with a client computing device 102 operated by a user. Further, the computing system 100 is able to retrieve webpages 104-106 from computer readable storage locations by way of network connections.

The computing system 100 includes a processor 108 and memory 110, where the memory 110 includes instructions that are executed by the processor 108. The computing system 100 further includes a data store 112. The data store 112 includes a web index 114, instant answers 116, and a knowledge graph 118. The web index 114 can be employed to identify webpages that include contents that are related to queries. The instance answers include answers to fact-based queries, such as "what is the population of the United States", "what is the distance between Earth and the moon", etc. The knowledge graph 118 is searchable to identify entities and information about the entities.

The memory 110 includes a generative model 120 that is configured to receive user input and generate output based upon the user input. In an example, the generative model 120 is a transformer-based model, such as the GPT-4 model, the BLOOM model, and so forth. The memory 110 further includes a search engine 122 that is configured to search the web index 114, the instant answers 116, and/or the knowledge graph 118 based upon user input received from the client computing device 102 and/or a query generated by the generative model 120. Accordingly, the search engine 122 identifies webpage(s), instant answer(s), entity information, etc. that are related to the user input received by the computing system 100 from the client computing device 102.

The memory 110 also includes a content extractor module 124 that extracts contents from sources identified by the search engine 122 (such as webpages). For example, the content extractor module 124 can extract contents from webpages identified by the search engine 122 as being related to the user input. The extracted contents can be included in prompts that are provided to the generative model 120 as input to the generative model 120. In an example, the search engine identifies the first webpage 104 as including content related to the user input, the content extractor module 124 extracts webpage content 126 from the first webpage 104, and the content extractor module 124 provides the webpage content 126 to the generative model 120 (as a portion of a prompt, where the prompt may also include the user input received from the client computing device 102).

The generative model 120 generates output based upon the prompt. The output generated by the generative model 120 can include text, an image, a video, etc. Further, the output generated by the generative model 120 can include a citation to the first webpage 104 from which the webpage content 126 was extracted by the content extractor module 124, where the citation is associated with text generated by the generative model 120. The generative model 120 generates the citation based upon the prompt provided to the generative model 120. Accordingly, a user reviewing the output of the generative model 120 can ascertain that the text generated by the generative model 120 is supported by content of the first webpage 104 due to a citation to the first webpage 104 being associated with the text.

The memory 110 further includes a text identifier module 128 that searches output of the generative model 120 for a citation and identifies text that is associated with the citation. For example, when a citation occurs at the end of a sentence, the text identifier module 128 can identify the sentence that precedes the citation as the text that is associated with the citation. In another example, a citation may have the form "according to XXXX". The text identifier module 128 can employ a rule that searches for such language (e.g., "according to"), and can identify text that follows such language as text that is associated with the citation.

The memory 110 also includes a classifier 130 that is configured to: 1) receive text and content used by the generative model 120 in connection with generating the text; and 2) output a prediction as to whether the text is supported by the content. Therefore, the classifier 130 can receive text generated by the generative model 120 and content of a webpage cited to by the generative model 120 as supporting the text. The classifier 130 can output a prediction as to whether the text is supported by the content. In an example, the classifier 130 is a binary classifier that outputs a value of 0 when text is not supported by content, while the classifier 130 outputs a value of 1 when the text is supported by the content. In another example, the classifier 130 outputs a probabilistic value that is indicative of a confidence of the classifier 130 when predicting whether text is supported by content.

With reference to determining whether text generated by the generative model 120 is supported by content, text is supported by content when the text includes a fact or claim that is also represented in the content. For example, text generated by the generative model 120 is not supported by content when the text includes an incorrect statement of fact that is not included in the content. In another example, text generated by the generative model 120 is not supported by content when the text includes a statement that is contradictory to statements included in the content.

The memory 110 also optionally includes a ranker module 132 that ranks different contents included in the prompt with respect to text generated by the generative model 120, where the contents are extracted from different sources. It has been observed that the generative model 120 generates text and then generates a citation to a source (e.g., webpage) as supporting such text, when in actuality a different source supports the text generated by the generative model 120. Therefore, when the classifier 130 predicts that the text generated by the generative model 120 is not supported by the content that corresponds to the citation for the text, the ranker module 132 can rank contents provided to the generative model 120 in the prompt with respect to the text in connection with ascertaining whether the generative model 120 should have cited to a different source as supporting the text. In an example, the ranker module 132 treats the text generated by the generative model 120 as a query and treats contents extracted from sources by the content extractor module 124 as potential search results. The ranker module 132 thus computes a ranking score for each content. When a first score for the content cited to by the citation is lower than a second score for second content, then the ranker module 132 can provide the classifier 130 with the second content and the text generated by the generative model 120. The classifier 130 may then predict whether the text generated by the generative model 120 is supported by the second content. When the classifier 130 predicts that the text generated by the generative model 120 is supported by the second content, the citation to the content can be replaced with a citation to the second content.

The memory 110 further includes a text rewriting model 134 that rewrites text generated by the generative model 120, where the text has been identified by the classifier 130 as not being supported by a source identified in a citation generated by the generative model 120, and further where the citation is associated with the text. More specifically, the text rewriting model 134 can be provided with text generated by the generative model 120 and content extracted from a source (e.g., webpage, instant answer, entity card, etc.) identified in a citation for the text (where the citation is generated by the generative model 120). The text rewriting model 134 is trained to rewrite text such that a rewriting of the text is supported by content provided to the text rewriting model 134. For instance, the text rewriting model 134 is trained based upon text pairs, where each pair includes: 1) text generated by the generative model 120; and 2) content corresponding to a citation for the text. Each pair can be labeled to indicate whether or not the text in the pair is supported by the content in the pair. Hence, when the text rewriting model 134 is provided with text and content, the text rewriting model 134 can rewrite the text to ensure that such text is supported by the content. The text rewriting model 134 can cause the rewriting of the text to be transmitted to the client computing device 102 for presentment as a response to the user input received from the client computing device 102.

Figure 2:
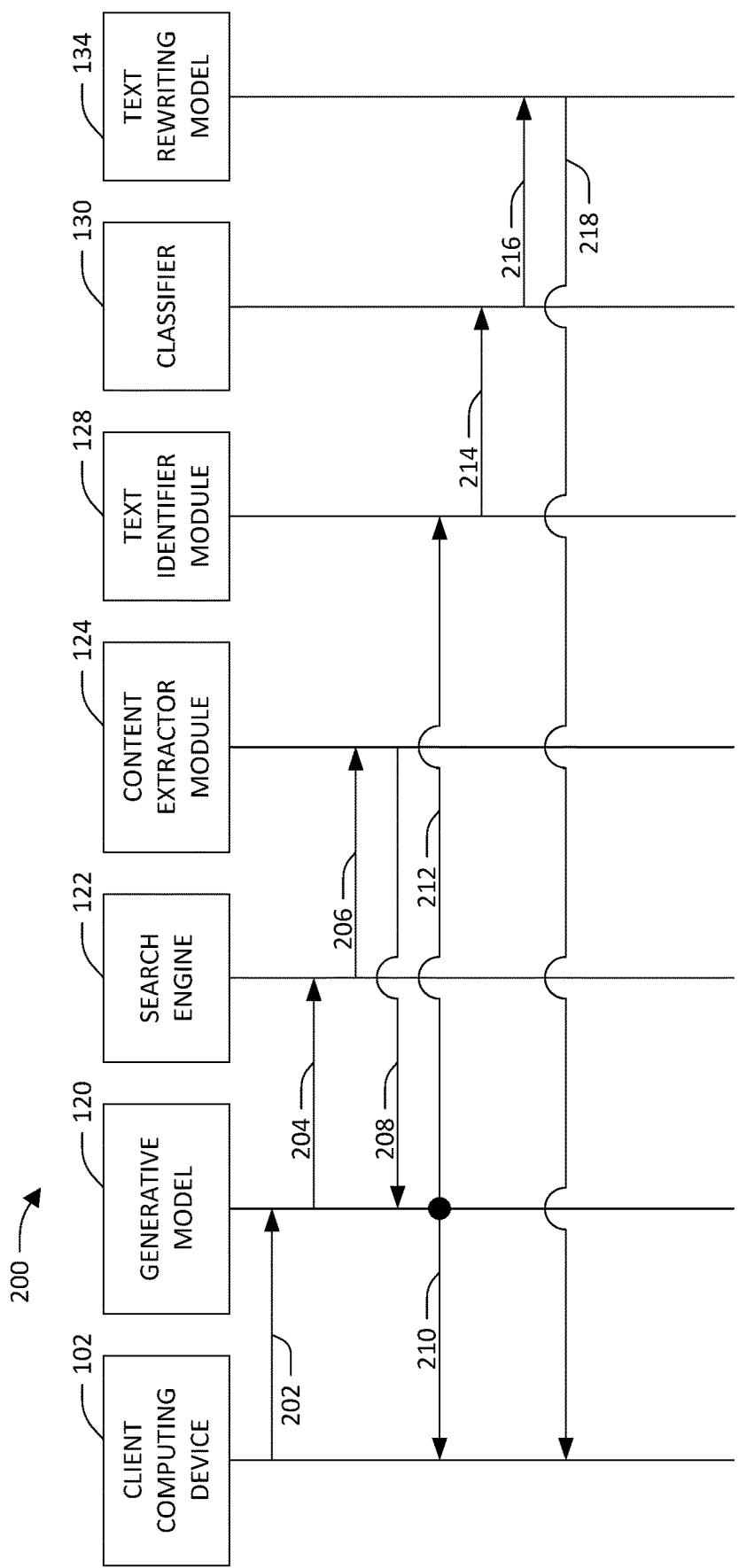
FIG. 2 is a communications diagram that depicts communications undertaken between devices and computer-implemented modules in connection with rewriting text generated by a generative model.

Operation of the computing system 100 is now described with reference to FIG. 2. FIG. 2 is a communications diagram 200 that depicts communications that occur between the client computing device 102, the generative model 120, the search engine 122, the content extractor module 124, the text identifier module 128, the classifier 130, and the text rewriting model 134. At 202, the generative model 120 receives user input from the client computing device 102. The user input can include text set forth in a conversational manner, a query, a statement, etc. Further, the client computing device 102 can receive the user input as voice input, text input by way of a keyboard, and so forth.

Upon receipt of the user input, the generative model 120 can optionally generate a query based upon the user input. For example, the user input may be relatively long and/or complex, and the generative model 120 can generate a query based upon the user input that is well suited for provision to the search engine 122. At 204, the generative model 120 provides the user input and/or the query generated by the generative model 120 to the search engine 122. The search engine 122 searches the web index 114, the instant answers 116, and the knowledge graph 118 based upon the user input and/or the query. In an example, the search engine 122 identifies the first web page 104 as including content that is related to the user input and/or the query. The search engine 122 can retrieve the first webpage 104, including markup language associated with the first webpage 104, plain text included in the first webpage 104, metadata of the first webpage 104, and so forth.

At 206, the search engine 122 provides the first webpage 104 to the content extractor module 124. The content extractor module 124 extracts content (the webpage content 126) from the first webpage 104, where the webpage content 126 is identified by the content extractor module 124 as being relevant to the user input and/or the query. For instance, the first webpage 104 may be relatively dense and can include a large amount of text. The content extractor module 124 is configured to identify a portion of the first webpage 104 that is relevant to the user input and/or the query, where the portion is of a size such that the generative model 120 can receive the webpage content 126 as input. At 208, the content extractor module 124 provides the webpage content 126 to the generative model 120, where the webpage content 126 is included in a prompt that is employed by the generative model 120 to generate output.

Upon receipt of the prompt, the generative model 120 begins to generate output (tokens in a sequence). At 210, and optionally, the generative model 120 provides the client computing device 102 with the output as the generative model 120 generates such output. As noted above, the output can include text generated by the generative model 120 based upon information in the prompt (the user input, the query, the webpage content 126, and so forth). In addition, the output includes a citation generated by the generative model 120. For instance, the citation identifies the first webpage 104 as supporting text in the output (e.g., a sentence in the output).

At 212, and substantially simultaneously with transmitting the output to the client computing device 102, the output generated by the generative model 120 is provided to the text identifier module 128. The text identifier module 128 parses the output for a citation. When the text identifier module 128 identifies the citation in the output, the text identifier module 128 can identify the text generated by the generative model 120 that corresponds to the citation. For instance, the text identifier module 128 can employ a rule or a set of rules to identify text that corresponds to citations.

At 214, in response to the text identifier module 128 identifying the citation (that identifies the first webpage 104) in the output generated by the generative model 120, and further in response to identifying the text generated by the generative model 120 that is associated with such citation, the text identifier module 128 provides the text and the webpage content 126 (included in the prompt) to the classifier 130. In another example, the text identifier module 128 can provide an entirety of the first webpage 104 to the classifier 130.

As described above, the classifier 130 predicts whether the text generated by the generative model 120 is supported by the webpage content 126. When the classifier 130 predicts that the text generated by the generative model 120 is supported by the webpage content 126, the text generated by the generative model 120 is not modified. When, however, the classifier 130 predicts that the text generated by the generative model 120 is not supported by the webpage content 126 extracted from the first webpage 104, then at 216 the text rewriting model 134 is provided with the text generated by the generative model 120 and the webpage content 126. In addition, and optionally, the text rewriting model 134 can be provided with further information and can use such information to rewrite the text. For example, the text rewriting model 134 can be provided with values of logits of the generative model 120 that correspond to the text generated by the generative model 120. In another example, the text rewriting model 134 is provided with values of hidden layers of the generative model 120 that correspond to the text generated by the generative model 120. In yet another example, the text rewriting model 134 is provided with the user input received by the generative model 120 from the client computing device 102. In still yet another example, the text rewriting model 134 is provided with the query generated by the generative model 120. In yet another example, the text rewriting model 134 is provided with information from the classifier 130.

Further, while the text rewriting model 134 and the classifier 130 are illustrated as being distinctive models, in an example the text rewriting model 134 itself includes classification functionality. For example, the text rewriting model 134 (which includes classification functionality) can include n hidden layers, and the text rewriting model 134 receives a text/content pair. Values of nodes at hidden layer m in the text rewriting model 134 can be used to determine whether the text should be written (thus potentially avoiding propagating information from layers m-n of the text rewriting model). Accordingly, representations from the mth layer (where m is some relatively small number compared to n) are employed to determine whether or not text rewriting is necessary. Hence, when rewriting is not necessary the text rewriting model 134 is exited after layer m, while if text rewriting is necessary then information is propagated through the remaining layers to create representations used for rewriting. In such an embodiment, the text rewriting model 134 can have an encoder-decoder architecture, similar to the T5 model.

While the communications diagram 200 depicts the classifier 130 as providing the text rewriting model 134 with such information, other flows of communication are contemplated. For instance, the classifier 130 can provide the text rewriting model 134 with the text generated by the generative model 120 and the webpage content 126. The text rewriting model 134 may then query the generative model 120 for logit values, values of hidden layers, user input, and so forth.

The text rewriting model 134 rewrites the text generated by the generative model 120 based upon the text generated by the generative model 120 and the webpage content 126. Further, as indicated above, the text rewriting model 134 can optionally rewrite the text based upon values of logits of the generative model 120, values of hidden layers of the generative model 120, user input provided to the generative model 120, and/or other information.

At 218, the text rewriting model 134 provides the rewriting of the text to the client computing device 102. In an example, the rewriting of the text replaces the text generated by the generative model 120 as presented at the client computing device 102. In another example, a graphical indicator is presented at the client computing device 102 indicating that the rewriting of the text is available upon receipt of user input. In still yet another example, the text generated by the generative model 120 and the rewriting of the text generated by the text rewriting model 134 are displayed simultaneously (and graphically differentiated) at the client computing device 102, such that the user of the client computing device 102 can identify the original text generated by the generative model 120 and the rewriting of the text.

Optionally, upon the text rewriting model 134 generating the rewriting of the text, the text rewriting model 134 can provide the rewriting of the text to the classifier 130. The classifier 130 can then predict whether the rewriting of the text is supported by the webpage content 126. This can repeat until the text rewriting model 134 generates a rewriting of the text that is supported by the webpage content 126.

The technologies described herein exhibit various advantages over conventional generative models that generate citations for text generated by the generative models. Specifically, the technologies described herein can identify hallucinations output by the generative model and correct such hallucinations, resulting in improved output that is presented to end users.

In another example, the text rewriting model 134 can be configured to rewrite an entirety of the output generated by the generative model 120 (instead of a sentence or phrase corresponding to a citation), where the text rewriting model 134 rewrites the text using the entirety of the prompt employed by the generative model 120 to generate the output. A disadvantage of such approach is that the text rewriting model 134 is unable to rewrite the text generated by the generative model 120 until the generative model 120 has generated the entirety of the output. In contrast, the approaches described above allow for the text rewriting model 134 to rewrite portions of an output (e.g., a phrase or sentence) generated by the generative model 120 prior to the generative model 120 completing the output. Another disadvantage of configuring the text rewriting model 134 to rewrite an entirety of the output of the generative model 120 is that the text rewriting model 134 may unnecessarily rewrite a portion of the output, thereby consuming additional processing resources. In contrast, the communications diagram 200 indicates that text is given to the text rewriting model 134 only when the classifier 130 has predicted that the text is not supported by content of a source (e.g., webpage) identified in a citation for the text. Moreover, providing the text rewriting model 134 with a relatively small amount of text (e.g., a sentence rather than several sentences) results in faster end to end rewriting time, as more time (and processing resources) is needed to build a query-key-value cache for longer input sequences, and each new generation time step will require more resources since the text rewriting model 134 is attending to a longer context length (when the text rewriting model 134 is a transformer language model).

Another advantage of the approach illustrated in FIG. 2 is that the memory 110 may include multiple instances of the text rewriting model 134, thereby allowing for several different text portions to be rewritten in parallel (thereby further speeding up the end to end rewriting process). For example, while first unsupported text is being rewritten, second unsupported text can be sent to another instance of the text rewriting model 134. Alternatively, if two different text portions are identified as being unsupported in very short succession, the text portions can be provided as a batch to a single instance of the text rewriting model 134.

Yet another advantage of the approach illustrated in FIG. 2 is that such approach allows for an initial token text sequence that has been generated (which is costly to produce in terms of computing resources, particularly at long token lengths) to remain intact to the extent that the text is supported, thereby conserving processing resources.

With reference now to FIGS. 3-7, example graphical user interfaces (GUIs) that correspond to a generative model are depicted. Referring specifically to FIG. 3, a GUI 300 includes a text entry field 302, where a user has set forth the input "how fast were personal computers in 1975?" into the text entry field 302. As described above, the generative model 120 can provide such input to the search engine 122 (and/or generate a query based upon such input and provide the query to the search engine), and the search engine 122 identifies a source (such as a webpage) based upon the user input and/or the query. The content extractor module 124 extracts content from the webpage and provides the extracted content to the generative model 120 as a portion of a prompt used by the generative model 120 to generate output. The graphical user interface 300 includes an output field 304 that depicts output generated by the generative model 120. As illustrated in FIG. 3, the output includes two sentences (and will include more sentences as the generative model 120 continues to generate output), with each sentence having a citation associated therewith that identifies a respective webpage that supports statements set forth in the sentences. In an example, the sentence "computer XXXX had a clock speed of 4 MHZ, meaning that it could perform four million instructions per second" is not supported by content of the second webpage that is identified in the citation associated with such sentence. Accordingly, the classifier 130 can predict that at least some of such sentence is not supported by the content of the second webpage, and the text rewriting model 134 can rewrite the sentence.

FIG. 4 depicts the GUI 300, where the output field 304 is updated to indicate to the user of the client computing device 102 that the second sentence has been rewritten (while the generative model 120 continues to generate output). For example, the second sentence generated by the generative model 120 is shown as having been struck through, and the rewriting of the text generated by the text rewriting model 134 is shown as being underlined. While FIG. 4 depicts a strikethrough of the entire sentence, in other examples only portions of a rewriting of a sentence that differ from the originally generated sentence can be highlighted to the user.

Turning now to FIG. 5, the GUI 300 is presented, where the unsupported sentence in the output field 304 is highlighted in the output field 304 (e.g., to indicate that the unsupported sentence is selectable). For instance, the unsupported sentence can be bolded, assigned a particular color, have a hyperlink assigned thereto, and so forth to inform the user that the classifier 130 has predicted that the highlighted sentence is not supported by the source identified in the citation that is associated with such sentence. Further, while not illustrated, the unsupported sentence can have a probability value computed by the classifier 130 displayed therewith, thereby providing additional information to the user as to the determined likelihood that the sentence should be rewritten. Referring now to FIG. 6, the GUI 300 is shown where the user has instructed the text rewriting model 134 to rewrite the unsupported sentence presented in FIG. 5. For example, the user can select the unsupported sentence, and upon the text rewriting model 134 receiving an indication that the unsupported sentence has been selected by the user, the text rewriting model 134 can generate a rewriting of the sentence and replace the unsupported sentence with the rewriting of the sentence. In another embodiment, the text rewriting model 134 can rewrite an unsupported sentence without user input based upon a confidence value associated with the unsupported text (indicative of a probability that the unsupported sentence should be rewritten). In an example, the user can set a probability score threshold (e.g., in a profile of the user), and the text rewriting model 134 can rewrite text based upon a probability score computed for the text relative to the probability score threshold set by the user.

With reference to FIG. 7, the GUI 300 is shown, where the output field 304 includes additional text generated by the generative model 120. FIG. 7 is set forth to illustrate that the text rewriting model 134 can rewrite one portion of the output generated by the generative model 120 while the generative model 120 continues to generate output. That is, the text rewriting model 134 can operate in parallel with the generative model 120.

Figure 8:
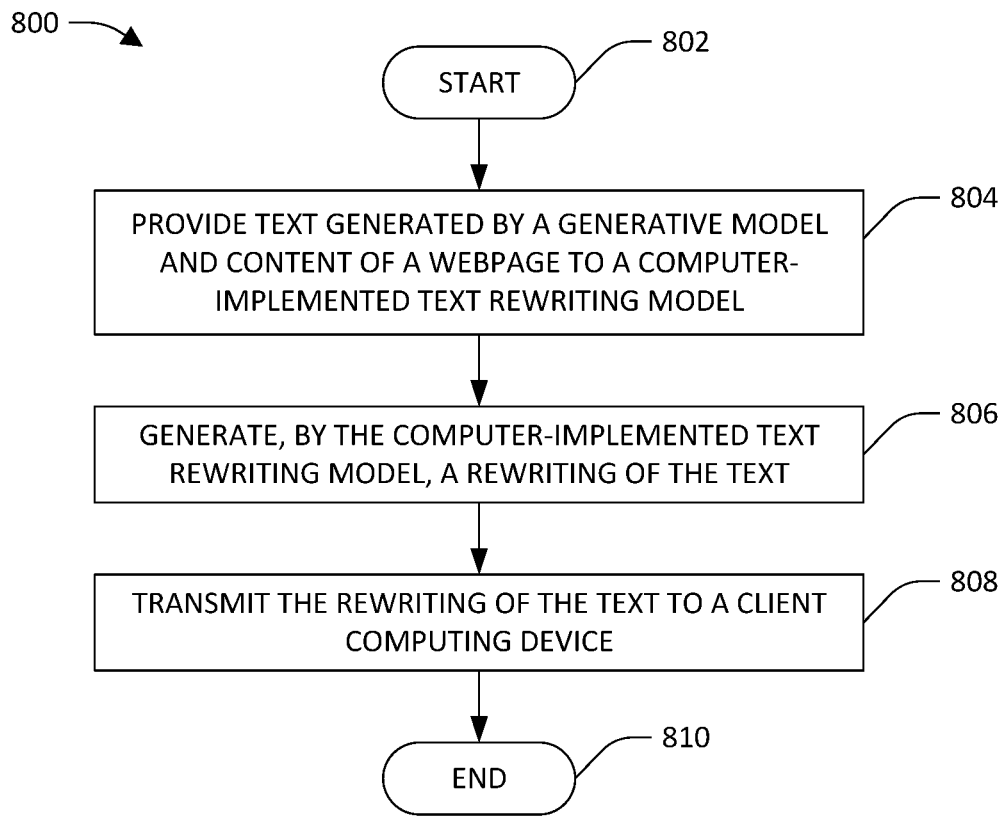
FIG. 8 is a flow diagram illustrating a method for rewriting text generated by a generative model.
Figure 9:
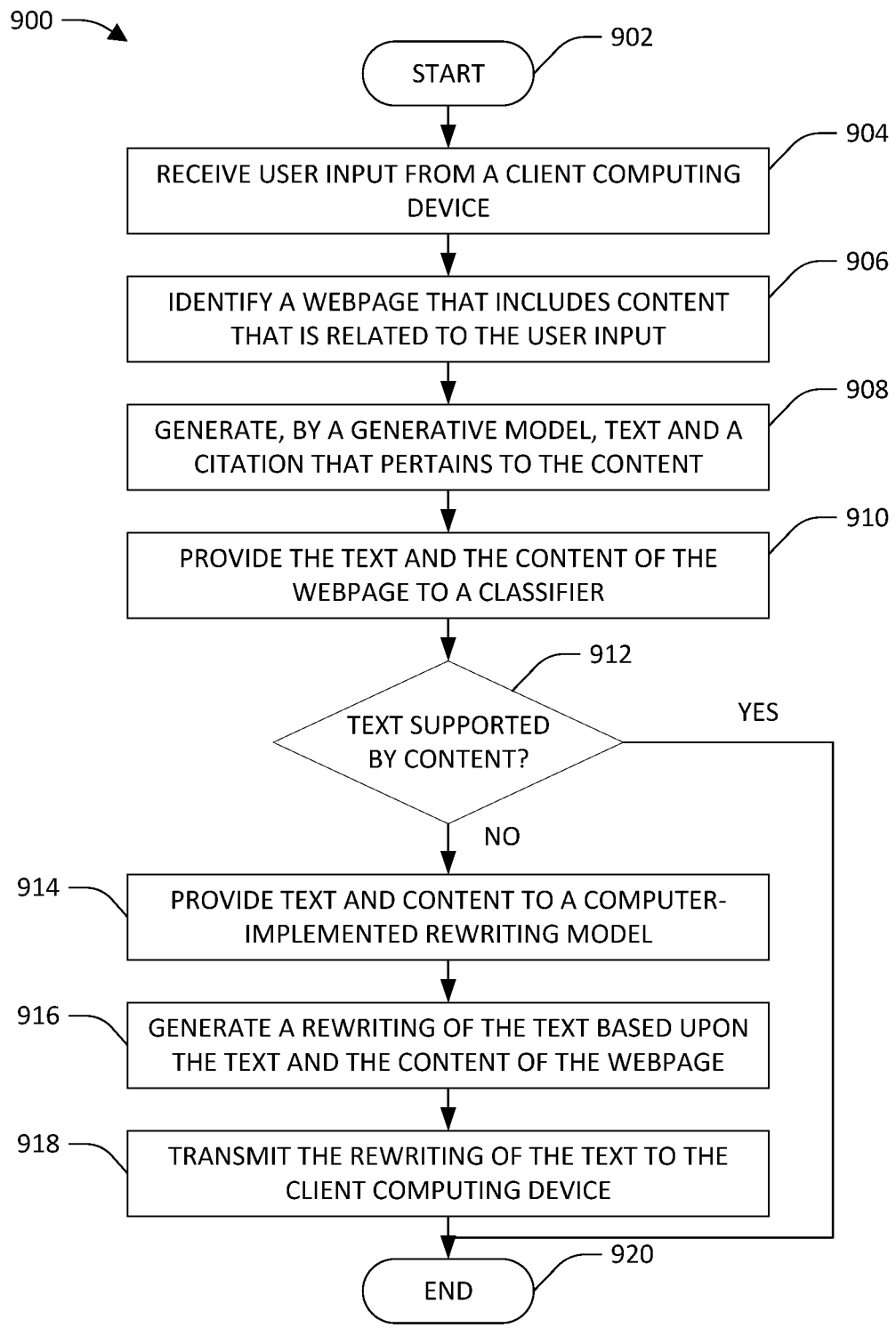
FIG. 9 is a flow diagram that illustrates a method for rewriting text generated by a generative model.

FIGS. 8 and 9 illustrate methods relating to rewriting text that has been generated by a generative model. While the methods are shown and described as being a series of acts that are performed in a sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 8, a flow diagram illustrating a method 800 for rewriting text is presented. The method 800 starts at 802, and at 804 text generated by a generative model and content of a source of content (such as a webpage) is provided to a computer-implemented text rewriting model. The generative model generated the text based upon user input received from a client computing device. In addition, the generative model generated a citation to the source to indicate that the text generated by the generative model is supported by the content of the source. At 806, a rewriting of the text is generated by the computer-implemented text rewriting model. The text rewriting model generates the rewriting of the text based upon the text generated by the generative model and the content of the source. At 808, the rewriting of the text is transmitted to the client computing device for presentment as a response to the user input received from the client computing device. The method 800 completes at 810.

Turning now to FIG. 9, a method 900 for rewriting text generated by a generative model is presented, where the method 900 is performed by a computing system. The method 900 starts at 902, and at 904 user input is received from a client computing device that is in network communication with the computing system. At 906, based upon the user input, a webpage is identified that includes content that is related to the user input. As described above, a search engine can identify a webpage based upon the user input received from the client computing device.

At 908, a generative model generates text and a citation that identifies the webpage, where the generative model generates the text and the citation based upon the user input received at 904 and the content of the webpage identified at 906.

At 910, the text and the content of the webpage are provided to a classifier, where the classifier has been trained to output indications (predictions) as to whether texts generated by the generative model are supported by webpage contents provided to the generative model when generating the texts. At 912, a determination is made as to whether the text generated by the generative model is supported by the content of the webpage identified in the citation.

When it is determined at 912 that the text generated by the generative model is not supported by the content of the webpage, at 914 the text and the content are provided to a computer-implemented text rewriting model. At 916, the text rewriting model generates a rewriting of the text. The text rewriting model generates the rewriting of the text based upon the text generated by the generative model and the content of the webpage. At 918, the rewriting of the text is transmitted to the client computing device as a response to the user input received from the client computing device. The method 900 ends at 920.

Figure 10:
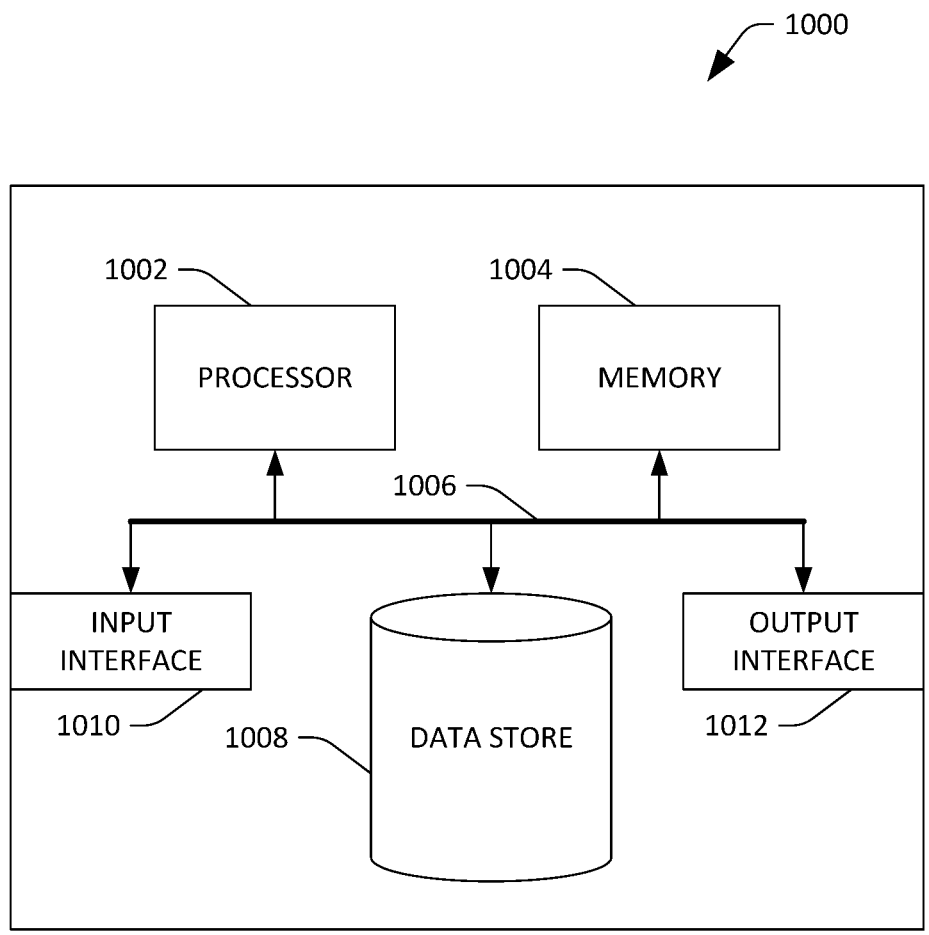
FIG. 10 is a functional block diagram of a computing system.

Referring now to FIG. 10, a high-level illustration of an exemplary computing device 1000 that can be used in accordance with the systems and methodologies disclosed herein is illustrated. For instance, the computing device 1000 may be used in a system that rewrites text generated by a generative model. By way of another example, the computing device 1000 can be used in a system that predicts whether text generated by a generative model is supported by a source identified in a citation that is associated with the text. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store text, images, webpage content, etc.

The computing device 1000 additionally includes a data store 1008 that is accessible by the processor 1002 by way of the system bus 1006. The data store 1008 may include executable instructions, a web index, instant answers, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various technologies have been described herein in accordance with at least the following examples.

(A1) In an aspect, a method performed by a computing system includes receiving user input from a client computing device that is in network communication with the computing system. The method also includes identifying a webpage that includes content that is related to the user input, where the webpage is identified based upon the user input. The method further includes generating, by a generative model, text and a citation that pertains to the content, where the generative model generates the text and the citation based upon the user input and the content of the webpage. The method additionally includes providing the text and the content of the webpage to a classifier, where the classifier has been trained to output indications as to whether texts generated by the generative model are supported by webpage contents provided to the generative model when generating the texts. The method also includes obtaining an indication from the classifier that the text is not supported by the content of the webpage. The method further includes providing the text and the content of the webpage to a computer-implemented text rewriting model, where the text and the content of the webpage are provided to the text rewriting model based upon the indication from the classifier that the text is not supported by the content of the webpage. The method additionally includes generating, by the computer-implemented text rewriting model, a rewriting of the text, where the computer-implemented text rewriting model generated the rewriting of the text based upon the text generated by the generative model and the content of the webpage. The method also includes transmitting the rewriting of the text to the client computing device as a response to the user input received from the client computing device.

(A2) In some embodiments of the method of (A1), the method also includes providing values of logits of the generative model to the computer-implemented text rewriting model, where the values of the logits correspond to the text generated by the generative model, and further where the computer-implemented text rewriting model generates the rewriting of the text based upon the values of the logits.

(A3) In some embodiments of the method of at least one of (A1)-(A2), the method also includes providing values of hidden layers of the generative model to the computer-implemented text rewriting model, where the values of the hidden layers correspond to the text generated by the generative model, and further wherein the computer-implemented text rewriting model generates the rewriting of the text based upon the values of the hidden layers.

(A4) In some embodiments of the method of at least one of (A1)-(A3), the method also includes determining that the citation pertains to the text, where the text and the content are provided to the classifier based upon the determining that the citation pertains to the text. Further, the citation is determined to pertain to the text prior to the text and the citation being provided to the classifier.

(A5) In some embodiments of the method of (A4), the generative model generates additional text based upon the user input, where the additional text follows the text, and further where the text and the content of the webpage are provided to the computer-implemented text rewriting model prior to the generative model completing the additional text.

(A6) In some embodiments of the method of at least one of (A1)-(A5), the method also includes transmitting the text and the citation to the client computing device prior to transmitting the rewriting of the text to the client computing device.

(A7) In some embodiments of the method of (A6), the method also includes causing a graphical indicator to be displayed at the client computing device to indicate that the text is not supported by the content of the webpage, where the graphical indicator is caused to be displayed in response to obtaining the indication from the classifier that the text is not supported by the content of the webpage.

(A8) In some embodiments of the method of at least one of (A1)-(A7), the method further includes providing the user input to the computer-implemented text rewriting model, where the computer-implemented text rewriting model generates the rewriting of the text based upon the user input.

(B1) In another aspect, a method performed by a computing system includes providing text generated by a generative model and content of a webpage to a computer-implemented text rewriting model, where the generative model generated the text based upon user input received from a client computing device, and further where the generative model generated a citation to the webpage to indicate that the text generated by the generative model is supported by the content of the webpage. The method also includes generating, by the computer-implemented text rewriting model, a rewriting of the text, where the computer-implemented text rewriting model generates the rewriting of the text based upon: 1) the text generated by the generative model; and 2) the content of the webpage. The method further includes transmitting the rewriting of the text to the client computing device for presentment as a response to the user input received from the client computing device.

(B2) In some embodiments of the method of (B1), the method also includes providing the text and the content of the webpage to a computer-implemented classifier, where the computer-implemented classifier is trained to determine whether texts generated by the generative model are supported by contents of webpages cited by the generative model for the text, and further where the text and the content are provided to the computer-implemented classifier prior to the text generated by the generative model and the content of the webpage being provided to the computer-implemented text rewriting model.

(B3) In some embodiments of the method of (B2), output of the generative model comprises the text and the citation to the webpage. The method also includes identifying that the citation to the webpage corresponds to the text in the output as the generative model generates the output. The method further includes providing the text and the content of the webpage to the computer-implemented classifier in response to identifying that the citation to the webpage corresponds to the text in the output.

(B4) In some embodiments of the method of at least one of (B1)-(B3), the method also includes providing an instruction to the computer-implemented text rewriting model together with the text and the content of the webpage, where the instruction instructs the text rewriting model to ensure that the rewriting of the text is supported by the content of the webpage.

(B5) In some embodiments of the method of at least one of (B1)-(B4), the method also includes: prior to transmitting the rewriting of the text to the client computing device, transmitting the text and the citation to the webpage to the client computing device for presentment as an initial response to the user input received from the client computing device.

(B6) In some embodiments of the method of (B5), the text is replaced by the rewriting of the text upon the client computing device receiving the rewriting of the text.

(B7) In some embodiments of the method of (B5), the method also includes: prior to transmitting the rewriting of the text to the client computing device and subsequent to transmitting the text and the citation to the webpage to the client computing device, causing at least one of the text or the citation to the webpage to be highlighted to indicate that the text is not supported by the content of the webpage. The method additionally includes receiving a request from the client computing device to provide the rewriting of the text to the client computing device, wherein the rewriting of the text is transmitted to the client computing device in response to receiving the request.

(B8) In some embodiments of the method of at least one of (B1)-(B7), the method also includes obtaining values of logits of the generative model that correspond to the text generated by the generative model, where the computer-implemented text rewriting model generates the rewriting of the text based further upon the values of the logits.

(B9) In some embodiments of the method of at least one of (B1)-(B8), the method further includes obtaining values of hidden layers of the generative model that correspond to the text generated by the generative model, where the computer-implemented text rewriting model generates the rewriting of the text based further upon the values of the hidden layers.

(B10) In some embodiments of the method of at least one of (B1)-(B9), the computer-implemented text rewriting model generates the rewriting of the text based further upon the user input.

(B11) In some embodiments of the method of at least one of (B1)-(B10), the method further includes providing the rewriting of the text and the content of the webpage to the computer-implemented text rewriting model. The method also includes generating, by the computer-implemented text rewriting model, a further rewriting of the text, where the computer-implemented text rewriting model generates the further rewriting of the text based upon: 1) the rewriting of the text generated by the computer-implemented text rewriting model; and 2) the content of the webpage. The method additionally includes transmitting the further rewriting of the text to the client computing device for presentment as another response to the user input received from the client computing device.

(C1) In another aspect, a computing system includes a processor and memory, where the memory stores instructions that, when executed by the processor, cause the processor to perform at least one of the methods disclosed herein (e.g., any of (A1)-(A8) or (B1)-(B11)).

(D1) In yet another aspect, a computer-readable storage medium includes instructions that, when executed by a processor, cause the processor to perform at least one of the methods disclosed herein (e.g., any of (A1)-(A8) or (B1)-(B11)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
      providing text generated by a generative model and content of a webpage to a computer-implemented text rewriting model, where the generative model generated the text based upon user input received from a client computing device, and further where the generative model generated a citation to the webpage to indicate that the text generated by the generative model is supported by the content of the webpage;
      generating, by the computer-implemented text rewriting model, a rewriting of the text, where the computer-implemented text rewriting model generates the rewriting of the text based upon:
         the text generated by the generative model; and
         the content of the webpage; and
      transmitting the rewriting of the text to the client computing device for presentment as a response to the user input received from the client computing device.

2. The computing system of claim 1, the acts further comprising:
   prior to providing the text generated by the generative model and the content of the webpage to the computer-implemented text rewriting model, providing the text and the content of the webpage to a computer-implemented classifier, where the computer-implemented classifier is trained to determine whether texts generated by the generative model are supported by contents of webpages cited by the generative model for the text; and obtaining, from the computer-implemented classifier, an indication that the text generated by the generative model is not supported by the content of the webpage, where the text and the content of the webpage are provided to the text rewriting model in response to obtaining the indication from the computer-implemented classifier.

3. The computing system of claim 2, where output of the generative model comprises the text and the citation to the webpage, the acts further comprising:
as the generative model generates the output, identifying that the citation to the webpage corresponds to the text in the output; and
providing the text and the content of the webpage to the computer-implemented classifier in response to identifying that the citation to the webpage corresponds to the text in the output.

4. The computing system of claim 1, the acts further comprising:
providing an instruction to the computer-implemented text rewriting model together with the text and the content of the webpage, where the instruction instructs the text rewriting model to ensure that the rewriting of the text is supported by the content of the webpage.

5. The computing system of claim 1, the acts further comprising:
prior to transmitting the rewriting of the text to the client computing device, transmitting the text and the citation to the webpage to the client computing device for presentment as an initial response to the user input received from the client computing device.

6. The computing system of claim 5, wherein the text is replaced by the rewriting of the text upon the client computing device receiving the rewriting of the text.

7. The computing system of claim 5, the acts further comprising:
prior to transmitting the rewriting of the text to the client computing device and subsequent to transmitting the text and the citation to the webpage to the client computing device, causing at least one of the text or the citation to the webpage to be highlighted to indicate that the text is not supported by the content of the webpage; and
receiving a request from the client computing device to provide the rewriting of the text to the client computing device, wherein the rewriting of the text is transmitted to the client computing device in response to receiving the request.

8. The computing system of claim 1, the acts further comprising:
obtaining values of logits of the generative model that correspond to the text generated by the generative model, where the computer-implemented text rewriting model generates the rewriting of the text based further upon the values of the logits.

9. The computing system of claim 1, the acts further comprising:
obtaining values of hidden layers of the generative model that correspond to the text generated by the generative model, where the computer-implemented text rewriting model generates the rewriting of the text based further upon the values of the hidden layers.

10. The computing system of claim 1, wherein the computer-implemented text rewriting model generates the rewriting of the text based further upon the user input.

11. The computing system of claim 1, the acts further comprising:
providing the rewriting of the text and the content of the webpage to the computer-implemented text rewriting model; and
generating, by the computer-implemented text rewriting model, a further rewriting of the text, where the computer-implemented text rewriting model generates the further rewriting of the text based upon:
the rewriting of the text generated by the computer-implemented text rewriting model; and
the content of the webpage; and
transmitting the further rewriting of the text to the client computing device for presentment as another response to the user input received from the client computing device.

12. A method performed by a computing system, the method comprising:
receiving user input from a client computing device that is in network communication with the computing system;
based upon the user input, identifying a webpage that includes content that is related to the user input;
generating, by a generative model, text and a citation that pertains to the content, where the generative model generates the text and the citation based upon the user input and the content of the webpage;
providing the text and the content of the webpage to a classifier, where the classifier has been trained to output indications as to whether texts generated by the generative model are supported by webpage contents provided to the generative model when generating the texts;
obtaining an indication from the classifier that the text is not supported by the content of the webpage;
based upon the indication from the classifier that the text is not supported by the content of the webpage, providing the text and the content of the webpage to a computer-implemented text rewriting model;
generating, by the computer-implemented text rewriting model, a rewriting of the text, where the computer-implemented text rewriting model generated the rewriting of the text based upon the text generated by the generative model and the content of the webpage; and
transmitting the rewriting of the text to the client computing device as a response to the user input received from the client computing device.

13. The method of claim 12, further comprising providing values of logits of the generative model to the computer-implemented text rewriting model, where the values of the logits correspond to the text generated by the generative model, and further wherein the computer-implemented text rewriting model generates the rewriting of the text based upon the values of the logits.

14. The method of claim 12, further comprising providing values of hidden layers of the generative model to the computer-implemented text rewriting model, where the values of the hidden layers correspond to the text generated by the generative model, and further wherein the computer-implemented text rewriting model generates the rewriting of the text based upon the values of the hidden layers.

15. The method of claim 12, the method further comprising:
prior to providing the text and the citation to the classifier, determining that the citation pertains to the text, where the text and the content are provided to the classifier based upon the determining that the citation pertains to the text.

16. The method of claim 15, where the generative model generates additional text based upon the user input, where the additional text follows the text, and further where the text and the content of the webpage are provided to the computer-implemented text rewriting model prior to the generative model completing the additional text.

17. The method of claim 12, further comprising transmitting the text and the citation to the client computing device prior to transmitting the rewriting of the text to the client computing device.

18. The method of claim 17, further comprising:
in response to obtaining the indication from the classifier that the text is not supported by the content of the webpage, causing a graphical indicator to be displayed at the client computing device to indicate that the text is not supported by the content of the webpage; and
receiving a request from the client computing device for the rewriting of the text, where the text and the content of the webpage are provided to the computer-implemented text rewriting model upon receiving the request.

19. The method of claim 12, further comprising providing the user input to the computer-implemented text rewriting model, where the computer-implemented text rewriting model generates the rewriting of the text based upon the user input.

20. A computer-readable storage medium comprising instructions that, when executed by a processor, cause the processor to perform acts comprising:
providing text generated by a generative model and content of a webpage to a computer-implemented text rewriting model, where the generative model generated the text based upon user input received from a client computing device, and further where the generative model generated a citation to the webpage to indicate that the text generated by the generative model is supported by the content of the webpage;
generating, by the computer-implemented text rewriting model, a rewriting of the text, where the computer-implemented text rewriting model generates the rewriting of the text based upon:
the text generated by the generative model; and
the content of the webpage; and
transmitting the rewriting of the text to the client computing device for presentment as a response to the user input received from the client computing device.

* * * * *